(12) United States Patent
Bergsten

(10) Patent No.: US 8,978,445 B2
(45) Date of Patent: Mar. 17, 2015

(54) SYSTEM AND A METHOD RELATING TO MEASURING HUMIDITY IN A VENTILATED SPACE

(76) Inventor: Rikard Bergsten, Göteborg (SE)

( * ) Notice: Subject to any disclaimer, the term of this patent is extended or adjusted under 35 U.S.C. 154(b) by 353 days.

(21) Appl. No.: 13/636,686

(22) PCT Filed: Mar. 22, 2011

(86) PCT No.: PCT/SE2011/050311
§ 371 (c)(1),
(2), (4) Date: Sep. 22, 2012

(87) PCT Pub. No.: WO2011/119092
PCT Pub. Date: Sep. 29, 2011

(65) Prior Publication Data
US 2013/0008232 A1    Jan. 10, 2013

(30) Foreign Application Priority Data
Mar. 23, 2010    (SE) .................................... 1050265

(51) Int. Cl.
*G01N 7/00*    (2006.01)
*G01N 37/00*   (2006.01)
(Continued)

(52) U.S. Cl.
CPC .............. *G05D 22/02* (2013.01); *F24F 5/0046* (2013.01); *F24F 11/0001* (2013.01);
(Continued)

(58) Field of Classification Search
USPC ............................ 73/1.02, 1.06, 29.01, 29.02
See application file for complete search history.

(56) References Cited

U.S. PATENT DOCUMENTS 5,033,284 A * 7/1991 Belt et al. ..................... 73/1.06
6,073,480 A * 6/2000 Gokhfeld ..................... 73/29.02
7,509,838 B2 * 3/2009 Paukkunen ................... 73/29.01
(Continued)

FOREIGN PATENT DOCUMENTS

DE    102005012373 A1    9/2006
FR    2716975            9/1995
(Continued)

OTHER PUBLICATIONS

Swedish Patent Office, Int'l Search Report in PCT/SE2011/050311, Jun. 27, 2011.

*Primary Examiner* — Hezron E Williams
*Assistant Examiner* — David Z Huang
(74) *Attorney, Agent, or Firm* — Piedmont Intellectual Property

(57) ABSTRACT

The present invention relates to a system and a method for measuring humidity in a ventilated space (3) comprising humidity sensing means (10), a heating device (20₁), and a control system (30₁) having access to pre-stored values on saturation vapor content of air at different temperatures. The relative humidity, $H_{rel}(T_1)$, at a first temperature, $T_1$, is measured, with the heating device inactivate. For TI a pre-stored saturation vapor content value, $V_{sat}(T_1)$, is found. A first absolute humidity value, $V_c(T_1)$, is calculated by multiplying the first saturation vapor content value by the first relative humidity value. A second relative humidity, $H_{rel}(T_2)$, at $T_2$ is measured, with the heating device on, a second vapor content value, $Hsat(T_2)$, at $T_2$ is found and a nominal relative humidity value, $RH_{nom}$, is calculated by dividing the first absolute humidity value, $Vc(T_1)$, by the second saturation vapor content value, $V_{sat}(T_2)$. The difference, $\Delta RH$, between the second measured relative humidity value, $H_{rel}(T_2)$, and the nominal relative humidity value, $RH_{nom}$ is established and used to adjust subsequent relative humidity measurements for error compensation.

18 Claims, 7 Drawing Sheets

(51) Int. Cl.
  *G05D 22/02* (2006.01)
  *F24F 5/00* (2006.01)
  *F24F 11/00* (2006.01)

(52) U.S. Cl.
  CPC .......... *F24F 11/006* (2013.01); *F24F 11/0012* (2013.01); *F24F 2005/0032* (2013.01); *F24F 2005/0064* (2013.01); *F24F 2011/0013* (2013.01); *F24F 2011/0038* (2013.01); *Y02B 10/20* (2013.01); *Y02B 10/24* (2013.01)
  USPC .......................................... 73/29.01; 73/1.02

(56) References Cited

U.S. PATENT DOCUMENTS

| | | | |
|---|---|---|---|
| 7,730,759 B2 * | 6/2010 | Rombach et al. | 73/1.59 |
| 2010/0125367 A1 * | 5/2010 | Burton et al. | 700/276 |
| 2011/0093216 A1 * | 4/2011 | Andersson et al. | 702/24 |

FOREIGN PATENT DOCUMENTS

| | | |
|---|---|---|
| GB | 2224578 A | 5/1990 |
| JP | 2005-62199 A | 3/2005 |

\* cited by examiner

SYSTEM AND A METHOD RELATING TO MEASURING HUMIDITY IN A VENTILATED SPACE

TECHNICAL FIELD

The present invention relates to a system for measuring humidity in a ventilated space, which system comprises a humidity sensing means, and to a corresponding method for measuring humidity in a ventilated space by means of which measurement errors of the humidity sensing means to a high extent or completely can be compensated for.

BACKGROUND

Humidity problems are often produced in cold spaces ventilated by exterior air, often only due to the humidity of the surrounding air and the fact that non-heated spaces often are as cold as, or even colder than, their surroundings and they will therefore accumulate humidity to levels wherein mould, fungi and other microorganisms can grow. The problems are aggravated if, in addition thereto, there are internal humidity sources such as for example leakage of humid air into an attic space from the living area. These humidity problems both lead to health problems and to large economical damages.

In order to facilitate the presentation below, some definitions are here given:

Absolute humidity is, conceptually seen, the amount of water in vapour phase that a given volume of air contains, normally expressed in grams per cubic meter, i.e. the density of the water vapour.

Vapour pressure here means the partial pressure of the water vapour in air in agreement with the praxis of the construction field. It should thus be noted that the definition of vapour pressure is different from the established definition within for example organical chemistry (wherein the vapour pressure instead means the pressure at which the evaporation of a substance is in equilibrium with its liquid and solid phases at a certain given temperature).

The saturation vapour content at a certain temperature is the amount of water in vapour phase that air maximally can contain before the water vapour starts to condensate at a surface or starts forming particles in the air.

The relative humidity is the relation between current absolute humidity and the saturation vapour content at the current temperature. This is at a given temperature numerically the same as the relation between the vapour pressure and the saturation vapour pressure, cf. for example Nevander, Elmarsson "Fukthandbok: Praktik och Teori", Svensk Byggtjänst 1994.

An arrangement has been described (WO 2009/038534 A1) by means of which a crawl space is ventilated with outdoor air only when the absolute humidity is higher indors than outdoors. An arrangement of this type is of course just as applicable at a cool attic space. Such an arrangement can be provided with a heating element which is triggered depending on the risk for mould growth and an attic or a crawl space is protected from damages caused by mould. The technique has been found to function well, particularly the combined solution comprising both absolute humidity controlled ventilation and heating, in those cases where the ventilation is not enough to obtain a climate which is mouldsafe. In connection with the fact that there, as mentioned above, also may be internal humidity sources, such as for example leakage of humid air into an attic space from the living area, it has sometimes been shown to be difficult to, despite the technique described in the cited document, avoid spotwise damages as a consequence of a locally occurring too high absolute humidity, which, in spite of the arrangement, may provide conditions such that for example growth of mould and fungi is promoted. In order to eliminate also this problem an arrangement has been constructed, which in one unit provides all of the so far discussed solution in a package, and which furthermore contains a fan for circulation of the air contained in the space also when there is no ventilation with exterior air. The mixing of air that thereby is obtained, eliminates the above mentioned problems efficiently.

The control of when ventilation with exterior is to take place or not is performed, as earlier described, using information from humidity sensors, wherein the respective relative humidity is measured by means of a sensor at the inside and a sensor at the outside.

It is customary to somewhat carelessly use the expression humidity sensor. Even if this is a functionally descriptive term, it actually does not say anything about what is actually measured. However, normally the temperature and the relative humidity, $H_{rel}$, are measured, which values used together give the absolute humidity.

The relations are as follows:

$H_{rel}$=absolute humidity/saturation vapour content (applicable as a general rule).

Since the saturation vapour content is a temperature dependent quantity it is available as a table value. Reconstruction of the above given relation gives:

Absolute humidity=$H_{rel}$×saturation vapour content.

Humidity sensors can in other words be described as something that measures the temperature and the relative humidity and something that, in some cases, from these values, extracts a signal corresponding to the absolute humidity.

A property of humidity sensors is that they have a long term stable precision but that they tend to drift in accuracy over time. The effect thereof is that previous systems either have required a regular calibration or their functioning has been poorer than what would have been possible with accurately calibrated sensors. So far it has not been possible to provide a system for measuring humidity in a ventilated space with a satisfactory accuracy. It has also been impossible to provide a system which enables provisioning of reliable measurement data on relative humidity over time and, in general, a system which is flexible.

SUMMARY OF THE INVENTION

It is therefore an object of the present invention to provide a system and a method for measuring humidity in a ventilated space by means of a humidity sensing means through which a good accuracy of the measurements can be obtained. It is particularly an object to provide a system and a method respectively through which the errors of the humidity sensor can be reduced or compensated for, a method of calibrating a humidity sensor.

It is particularly an object to provide a system and a method which is flexible, easy and cheap to implement and fabricate, and even more particularly, which is controllable as to the accuracy of measurement data.

It is a most particular object to provide an improved method for measuring the humidity in an air ventilation or recirculation system.

Therefore a system as initially referred to is provided which has the characterizing features of claim 1. A method having the characterizing features of claim 14 is therefore also provided. Advantageous embodiments are given by the features of the appended subclaims.

According to the invention, in a particular embodiment, the relative humidity of air passing the humidity sensing means is measured before the heating arrangement is switched on or connected and the result of the measurement, i.e. the value of the relative humidity, is registered by a control system. Then the absolute humidity of the air is established by the control system (or in the humidity sensing device) by multiplying the measured relative humidity by the saturation vapour content (e.g. tabulated) at the temperature at which the relative humidity was measured. Subsequently the heating arrangement is activated and the temperature of the air passing the heating element, or the humidity sensing device, which also provides temperature measurements, is measured when the air has reached a higher value, for example 50° C.

Thereupon a nominal relative humidity is established by dividing the established absolute humidity value at the first temperature by the saturation vapour content value at the higher temperature. The difference between the relative humidity at the second, higher, temperature and the nominal relative humidity is then established, giving a value with which subsequent measurement values obtained by the humidity sensing device can be reduced, the sensor calibrated, in order to compensate for the error of the measurement.

According to the invention such a processing can, e.g. in the case that the difference, the error, is considerable, be repeated as many times as necessary in order to obtain an acceptable, reliable value, particularly for the purposes of controlling a ventilation arrangement, and allowing accurate control of the relative humidity.

It can be said that a system/method according to the invention suggests an on-going procedure, or a self-calibration.

By means of the heating arrangement the temperature can be increased more or less and normally the number of iterations as described above that are required will normally be lower the higher the second temperature, or the larger the difference between the first and the second temperature. If only a smaller increase in temperature is provided, normally a larger number of iterations are required to obtain a satisfactory compensation. A better compensation is achieved with fewer steps the higher the increase in temperature is, i.e. the fewer iterations need to be done. However this is not necessarily the case under all circumstances. Of course it also depends on the accuracy that is needed etc.

In other embodiments it is also possible to start with, for the first measurement, a value where the air already is heated by a heating element, for example a conventional heating element for heating the space or the/a heating element for the purposes of the present invention. It should also be clear that the heating element used for purposes of the present invention can be a separate heating element arranged in order to perform the measurement, in a separate chamber, or a heating element specifically arranged in the space.

The invention is in a particular embodiment adapted to be used for spaces which normally are not heated.

BRIEF DESCRIPTION OF THE DRAWINGS

The invention will in the following be further described, in a non-limiting manner, and with reference to the accompanying drawings, in which.

DETAILED DESCRIPTION

Figure 1:
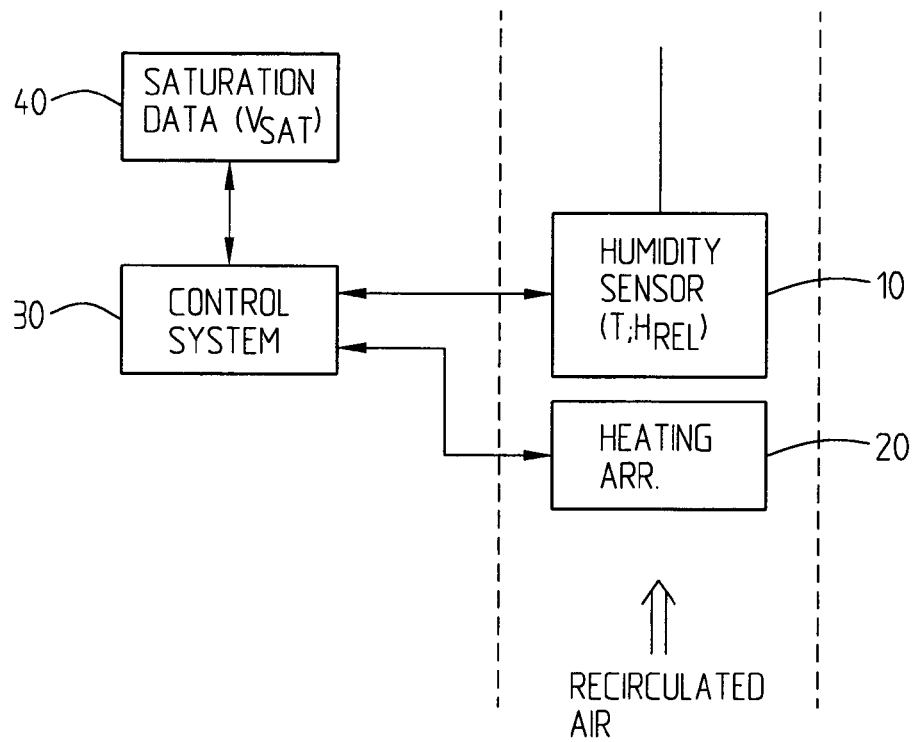
FIG. 1 is a schematical block diagram of a system according to a first embodiment of the invention.

FIG. 1 illustrates a first embodiment of a system according to the invention which comprises a humidity sensing device 10, here comprising a sensor for measuring both temperature and relative humidity $H_{rel}$. It further comprises a heating arrangement 20, for example a heating element. Both the humidity sensor 10 and the heating arrangement 20 are connected to a control system 30 which has access to information for example held in a storing means or a database or similar 40 of saturation data, $V_{sat}$, for a number of temperatures. The heating arrangement can be controlled by the control system, switched on, switched off, increased and decreased as to its heating power. The control system also controls the humidity sensor through activating when it is to measure the temperature and the relative humidity, deactivating it when not, possibly also for monitoring purposes.

Alternatively there is a certain intelligence and controlling processing capacity also in the sensing device itself. The heating arrangement 20 is arranged to heat up the air in, or from, the space (not shown in this figure) which is ventilated and the humidity sensor 10 is arranged after the heating arrangement, in the direction of the flow of the air, in some appropriate manner. Normally the air is circulated by means of a fan or similar; how this take place is not of importance for the functioning of the basic inventive concept.

According to the invention the humidity sensor 10 measures the relative humidity in air recirculated from the space at a first, lower, temperature giving a first relative humidity value $H_{rel}(T_1)$. In one particular embodiment this is done before the heating arrangement is switched on or activated, i.e. in the absence of heating. In alternative embodiments the heating arrangement may already have been switched on, or it comprises an activated heating arrangement for heating the space, in which case the second temperature normally is not so much higher than the first temperature leading to more iterations. Particularly the space is a space which normally is not heated. However, the invention is also applicable if the space is heated by some other heating arrangement.

The first relative humidity value and the first temperature are provided to the control system which (alternatively this function is performed in the sensing device itself, which also alternatively has access to the storing means), for the first temperature $T_1$, accesses an information holding means 40 to find the saturation vapour content value $V_{sat}(T_1)$ representing the saturation vapour content at said first temperature, and thereupon calculates a first absolute humidity value $V_c(T_1)$ by multiplying the first saturation content value $V_{sat}(T_1)$ by the first relative humidity value $H_{rel}(T_1)$. Then the control system is adapted to switch on or increase the power of the heating arrangement 20, preferably until a considerably higher temperature is reached; it may be controlled or monitored continuously to see if/when the temperature value becomes stable, or it can be monitored at intervals in any other appropriate manner.

Preferably the temperature is increased by 10° C.-70° C., preferably between 30° C.-60° C. Alternatively it is heated until a temperature between 20° C. and 70° C., preferably between 40° C. and 60° C., e.g. about 50° C. is reached. Then, for this temperature, which is called a second temperature, $T_2$, also the relative humidity is measured by the humidity sensor 10 thus providing a second relative humidity value $H_{rel}(T_2)$. Then, by means of the control system 30, a tabulated or approximated saturation vapour content value $V_{sat}(T_2)$ representing the saturation vapour content at said second temperature is found or established. The control means are then adapted to calculate a nominal relative humidity value $RH_{nom}$ by dividing the first absolute humidity value $V_c(T_1)$ by the second saturated vapour content value $V_{sat}(T_2)$ and to subsequently establish the difference $\Delta RH$ between the second measured relative humidity value and the said nominal relative humidity value.

This difference value $\Delta RH$ is then used to compensate for the error in subsequent measurement results on relative humidity performed by the humidity sensor. This procedure can also be repeated by using a compensated first relative humidity value as the first relative humidity value and performing the above described iterations one or more times (preferably awaiting until the temperature has gone down again). Normally, if the temperature difference is high, the number of iterations that need to be done is lower than if only a small temperature difference between $T_1$ and $T_2$ is used. If, and how many times, the iteration procedure is repeated, depends also on the accuracy that is needed.

Figure 2:
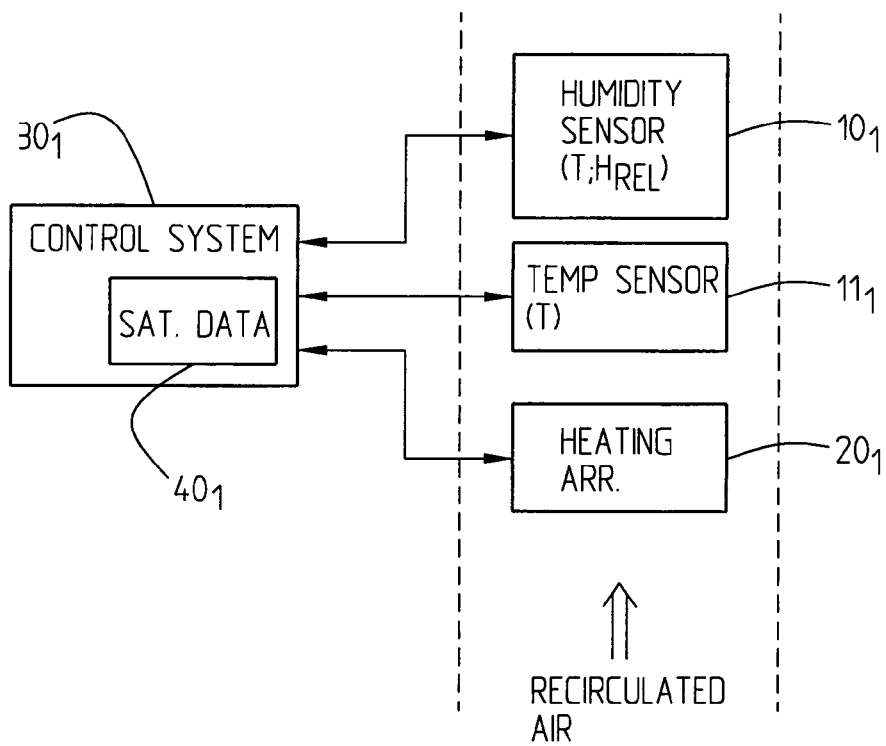
FIG. 2 is a schematical block diagram of a second embodiment of a system according to the invention.

FIG. 2 shows an alternative implementation wherein a humidity sensing device comprises a separate humidity sensor $10_1$ and a separate temperature sensor $11_1$ both communicating with the control system $30_1$, which here is supposed to comprise an information holding means or a processing means for finding approximations of saturation content value information $40_1$. It should be clear that the information holding means $40_1$ could have been provided as an external means also in this case, or alternatively that the humidity sensor is a dual function sensor for both measuring temperature and relative humidity. As in the embodiment described with reference to FIG. 1, a heating arrangement $20_1$ is arranged before the sensors in the air flow path to ensure that they will perform the "second" measurements on air that is really heated. A system according to the invention can be arranged in a separate chamber communicating with the space the humidity of/in which is to be measured by means of an inlet channel and an outlet channel, where it can be arranged in or at the outlet from the space, or close to the outlet of the space according to different embodiments.

Figure 3:
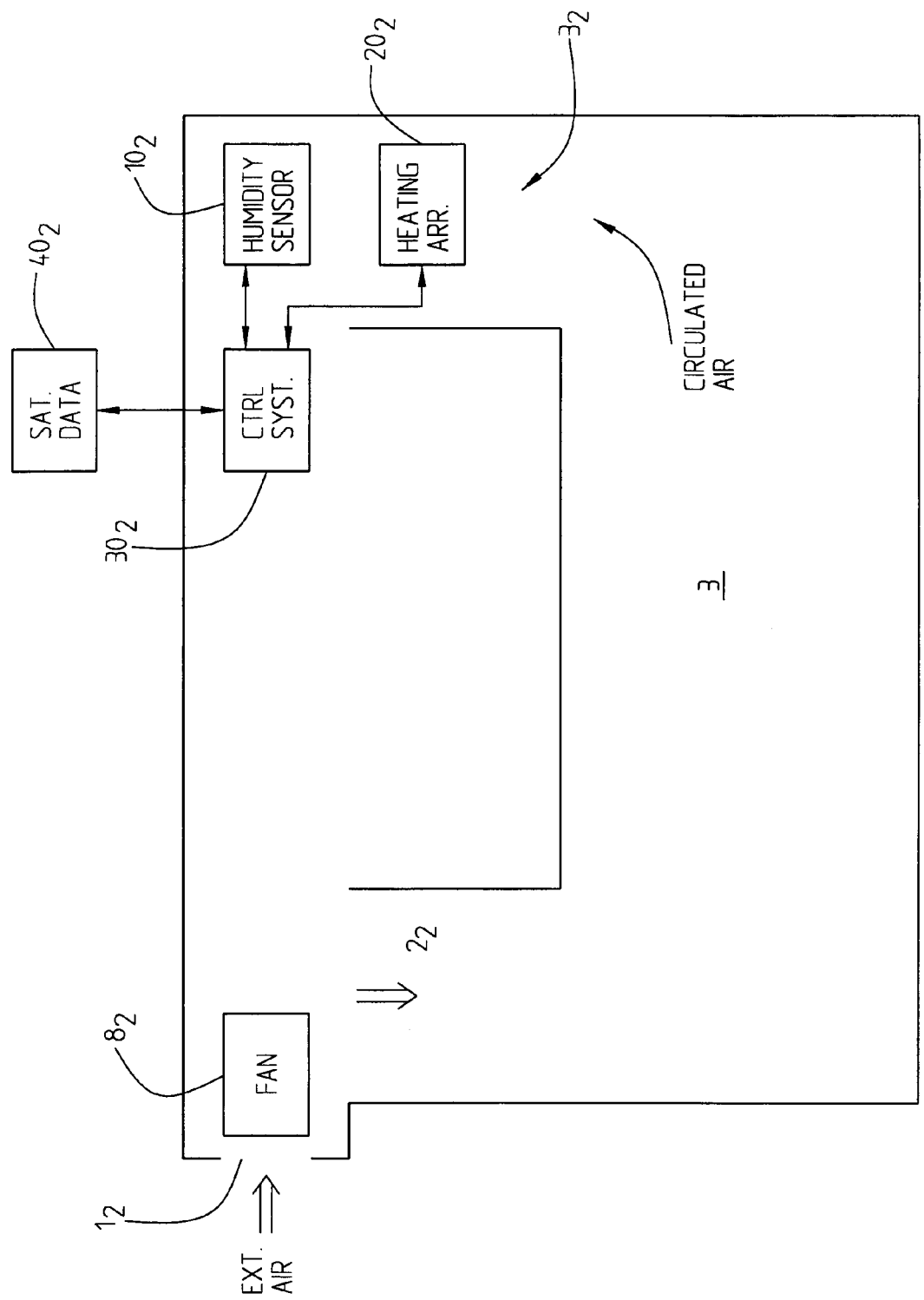
FIG. 3 is a schematical block diagram of a system according to the invention arranged to perform measurements on air from a ventilated space.

FIG. 3 very schematically illustrates an implementation of an arrangement of the system with respect to a ventilated space 3. As in FIGS. 1 and 2 it comprises a control system $30_2$, here separate data holding means $40_2$ holding information about saturation vapour content value at different temperatures, a humidity sensor $10_2$ arranged to measure the temperature and the humidity of recirculated air from the chamber and a heating arrangement $20_2$ arranged before the humidity sensor at an outlet channel $3_2$. The space 3 is connected to external, outside, air by means of a connection $1_2$ and air is circulated to the space by means of a fan $8_2$ at the inlet which is connected to the space 3 via an air inlet $2_2$.

Figure 4:
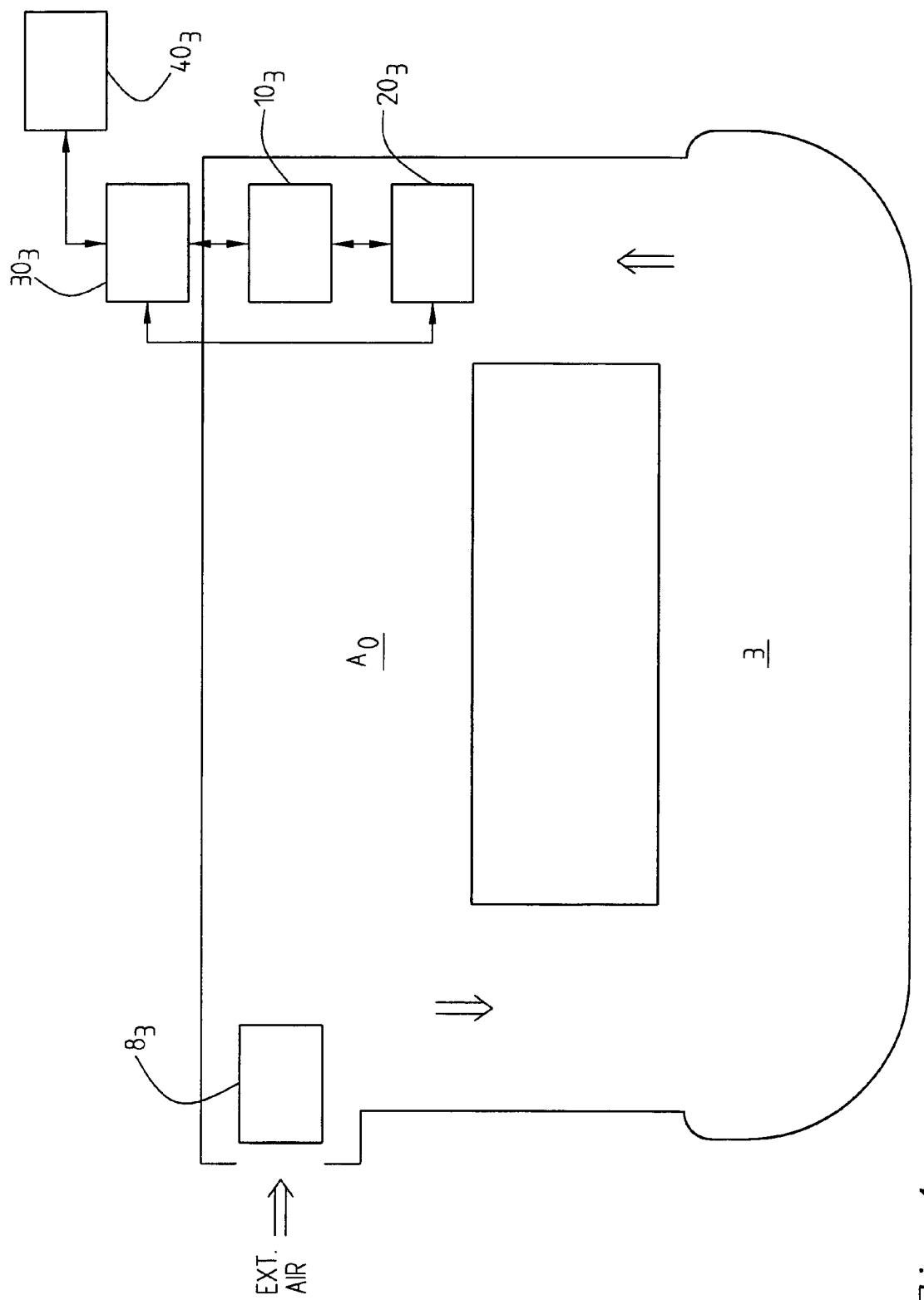
FIG. 4 is a block diagram of an alternative arrangement of a system according to the invention.

FIG. 4 shows an alternative arrangement of the system according to the invention in a chamber connected to the space 3 by means of an inlet and an outlet. Air is drawn into the chamber and the space by means of a fan $8_3$ and a heating arrangement $20_3$ is arranged in the chamber close to the outlet from the space 3. After, in the air flow direction, the heating arrangement $20_3$, a humidity sensing device $10_3$ is arranged, the latter in this embodiment being connected to the heating arrangement, which only is an option to enable communication between the sensing device and the heating arrangement such that for example the sensing device automatically can control or monitor the heating capabilities or current heating capability of the heating arrangement. The humidity sensing device $10_3$ and the heating arrangement $20_3$ are connected to, and are at least to some extent controlled by, a control system $30_3$ which here is arranged externally of the chamber $A_o$ and in turn communicates with external information holding means $40_3$. It should thus be clear that the control means can be arranged outside the chamber or inside the chamber, itself comprise the information holding means or be connected to external information holding means. In some simplified embodiments it might also be possible to manually provide the saturation value information.

Figure 5:
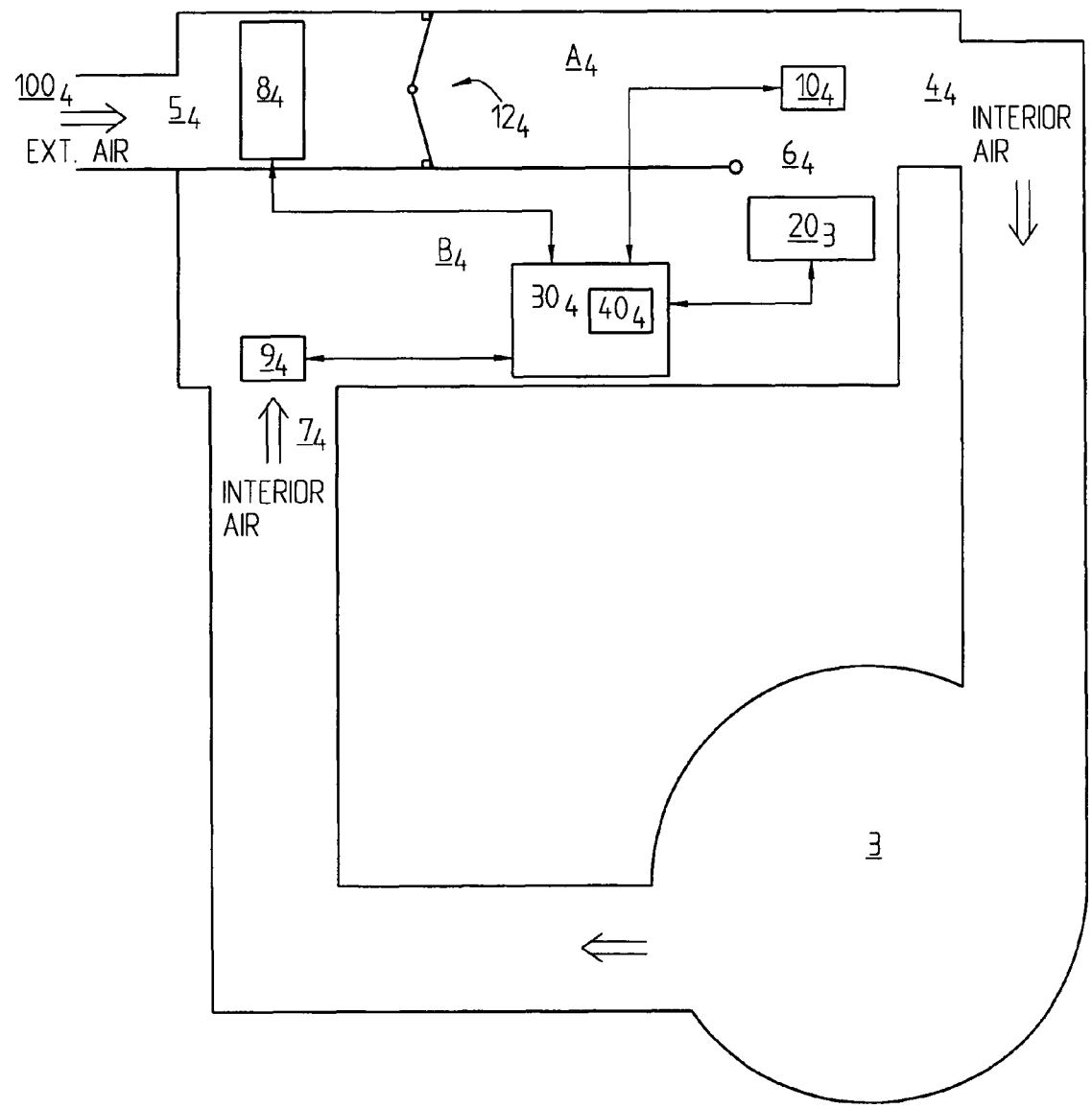
FIG. 5 is a schematical block diagram illustrating an implementation in which the system is arranged in association with an air ventilation system.

FIG. 5 shows a particular implementation in which the system according to the invention is used in combination with a ventilation or an air recirculation system. Such an arrangement here comprises a first chamber A and a second chamber B, although it should be clear that the first chamber A (i.e. two chambers) is not necessary for the functioning of the inventive concept. Normally, the first chamber A is here connected to interior air and the space 3 by means of a connection $4_4$, and to outdoor or exterior air by means of a connection $5_4$ and furthermore to the second chamber B via a connection $6_4$. The second chamber B is connected to indoor air by means of the connection $7_4$ and to the chamber A by means of connection $6_4$. A fan $8_4$ is arranged in chamber A so that it can force air from the outside (the connection $5_4$) and via a reverse ventilation damper $12_4$ to the connection $4_4$ to the inside (space 3). The connection between the first chamber A and the second chamber B is arranged after the reverse ventilation damper $12_4$ in the first chamber A. The reverse ventilation damper $12_4$ is so arranged that it opens when the fan $8_4$ in chamber A is active and it is closed when the fan $8_4$ in chamber A is inactive, whereby a fan $9_4$ in chamber B at the connection $7_4$ to interior air is active. To assure that the reverse ventilation damper $8_4$ always opens when it should, the fan $9_4$ should be adapted to give or provide the same or a lower overpressure than the fan $8_4$. The fan $9_4$ is so arranged in the second chamber B that it drives air from the interior air connection to the second chamber B into the first chamber A. The heating element $20_4$ is arranged in second chamber B at the connection $6_4$ between chamber A and chamber B. The control system $30_4$ is, as in the preceding embodiments, connected to the sensing device $10_4$, to the heating arrangement $20_4$, but here also to the first fan $8_4$ and the second fan $9_4$.

Figure 6:
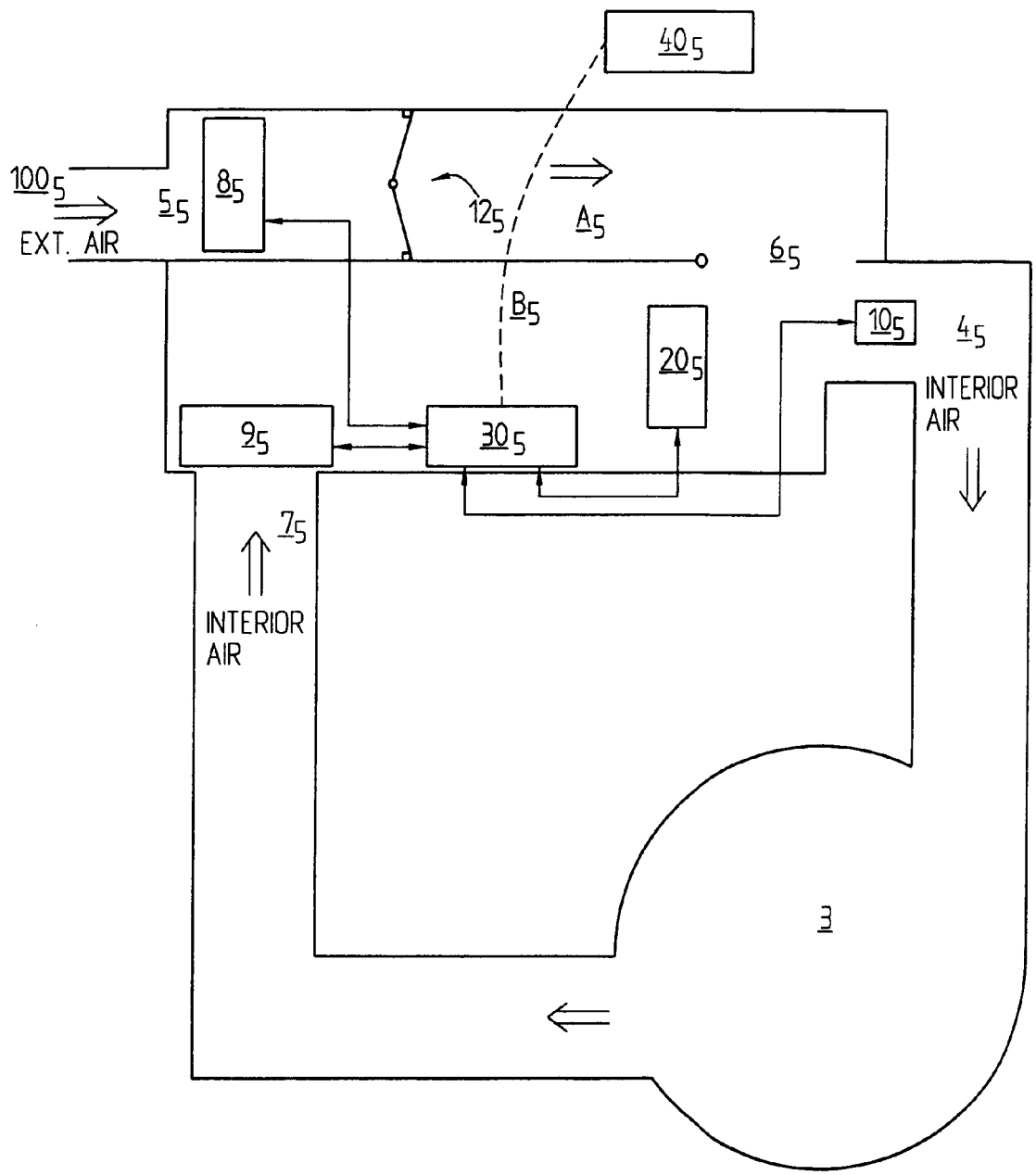
FIG. 6 is an alternative implementation of an arrangement of the system according to the invention with an air ventilation system.

FIG. 6 shows an alternative to the implementation given i FIG. 5 and similar means and components are given the corresponding reference signs but with index 5. It is here supposed that the connection between the first chamber A and the second chamber B has been rotated about 90° clockwise whereas the connection $4_5$ to the space 3, to which air is forced either from the outside or as recirculated air from the second chamber B, has been moved downwards as compared to in FIG. 5. Such an embodiment can be of advantage from an air flow point of view since the flows from both chambers will be well balanced.

The control system $30_5$ is arranged substantially as in FIG. 5. The humidity sensing device $10_5$ is here arranged at the entry, beginning, of connection $4_5$ to space 3. The information holding means $40_5$ are here supposed to be external.

In this embodiment the control system $30_5$ uses measurements from the humidity sensing device $10_5$ and controls the fans $8_5$ and $9_5$ and the heating arrangement $20_5$ as will be described below.

The control system $30_5$ provides for periodical measurements of the outdoor air by activating (switching on) the fan $8_5$ and by deacitvating (switching off) the fan $9_5$ and the heating arrangement $20_5$, and, after the sensing device has settled, (become stable) or after the lapse of a certain period of time, via the sensing device one or several connective measurements are carried out in order to establish the vapour pressure and/or absolute humidity of the exterior, outdoor air.

Further, under control of the control system, periodical measurements on indoor air are carried out while deactivating fan $8_5$ and the heating arrangement $20_5$ (if it was on) and activating fan $9_5$ and, after the sensor has settled, thus taking one or more consecutive measurements to establish vapour pressure and/or absolute humidity in indoor air. One of, or both, fans $8_5$, $9_5$ is/are always active.

The control system $30_5$ drives, in periods between measurements, the fan $8_5$ to blow air (draw air in) from outside when the vapour pressure or absolute humidity is lower in indoor air than in outdoor air, in one embodiment in such a manner that the operation speed is kept at a level lower than a normal operation level when the difference in vapour pressure or absolute humidity is low, and the speed of rotation is kept at a higher or normal operation level when the difference in vapour pressure or absolute humidity is large, possibly with an off-set which starts the fan only if a certain smallest difference in vapour pressure or absolute humidity is detected.

The control system $30_5$ controls, between the measurement periods when the measurements are undertaken, the fan $9_5$ so that it forces indoor air from the inside into the first chamber A and via its connection to the indoor air, back to the indoor air in space 3 when the fan $8_5$ is inactive or when the heating arrangement $20_5$ is active (which thus can be at same time as the fan $8_5$ is active). The control system $30_5$ controls, between the measurement periods, the heating arrangement so that it through a trigger point is active when the relative humidity of the indoor air exceeds said trigger point. The trigger point can be a fixed value on relative humidity or depend on the temperature and possibly also the period of time that the indoor air has been more humid or had a higher relative humidity than the value of the trigger point, so that the trigger point will follow the risk for microbial growth which, as such, also is temperature and time dependent.

Since the difference in for example absolute/relative humidity is calculated as a difference between two measurement values measured by one and the same sensor, an error which depends on a bad accuracy, will to a large extent be compensated for by itself as long as the sensor has good precision.

The switching on/off of the heating element $20_5$ is done towards an absolute value on the relative humidity and a drift in accuracy as far as a measurement thereof is concerned, will affect the trigger point which can have as a result an unnecessarily high energy consumption or a poor function.

This can for such an arrangement be prevented by the control system according to the invention whereby the relative humidity and the temperature are measured at the same time as the fan $8_5$ and the heating arrangement $20_5$ are switched off and, here, the fan $9_5$ is driven, whereby one or more measurements are performed after the lapse of the time that it takes for a sensing device $10_5$ to acclimatize and become stable, giving a first relative humidity at a first temperature.

Then the heating arrangement is switched on, activated, and after the time it takes for the sensor to become stable so that the temperature of the air at the sensing device is arranged has been increased considerably as compared to the temperature in the space 3, for example is between 10° C. and 70° C. higher, particularly between 30° C.-60° C. or at about 50° C. higher, or has reached a temperature of about 50° C., one or more consecutive measurements are performed on temperature and relative humidity at the said second temperature. Then the nominal humidity is calculated as the absolute humidity at the first temperature divided by the saturation content value off at the second temperature as discussed above. This value on nominal relative humidity will have a value which has been reduced in relation to the difference in saturation vapour content at the first temperature measurement and at a second temperature measurement.

Then a measured relative humidity is calibrated towards the nominal relative humidity and the calibration value (the difference between the nominal relative humidity and the measured relative humidity) is saved for future adjustments of obtained measurement values. The following example shows such a case in practice.

The system measures the relative humidity, $H_{rel}$, with an error of $+/-10\%$ to $90\%$ $H_{rel}$ at the temperature 0° C. The absolute humidity will then be the relative humidity value multiplied by the saturation vapour content value at the temperature in question, which in the case of 0° C. is 4.86 g/m$^3$, thus $90\% \times 4.86$ g/m$^3$=4.374 g/m$^3$ ($+/-10\%$). Then the heating element is activated whereupon the temperature is increased to 50° C. The saturation vapour content at 50° C. is about 83.11 g/m$^3$. The nominal relative humidity is the relative humidity divided by the saturation content value which makes 4.374 g/m$^3$/83.11 g/m$^3$=5.26%. If the error in the measurements made by the sensing device was 10% earlier, the hence calculated nominal $H_{rel}$ error has an error which is $10\% \times 4.86/83.11$=0.58%. A calibration towards the nominal $RH_{nom}$ thus reduces the error from 10% to 0.58%. If thus the established measurement error (the difference between measured $H_{rel}$ and nominal $H_{rel}(RH_{nom})$ was very large, the procedure can be repeated after the first calibration so that the measurement error can be still further reduced.

By using a heating arrangement to heat the air (in a chamber) to enable calculation of a nominal relative humidity with a considerably lower error than the measurement error of the sensor and measuring the relative humidity, the error of the sensor for humidity measurements can continuously be reduced. In these embodiments the control system can be provided in the first chamber A, in the second chamber B, or externally of the chambers.

Figure 7A:
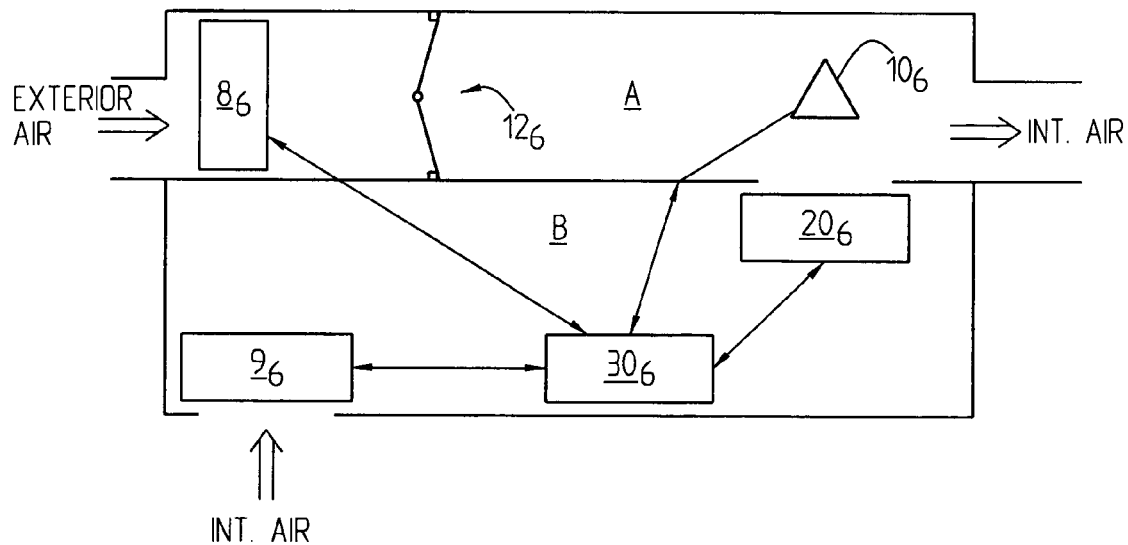
FIG. 7A is a schematical block diagram illustrating the system according to the invention in one implementation where it is connected to an air circulation system.
Figure 7B:
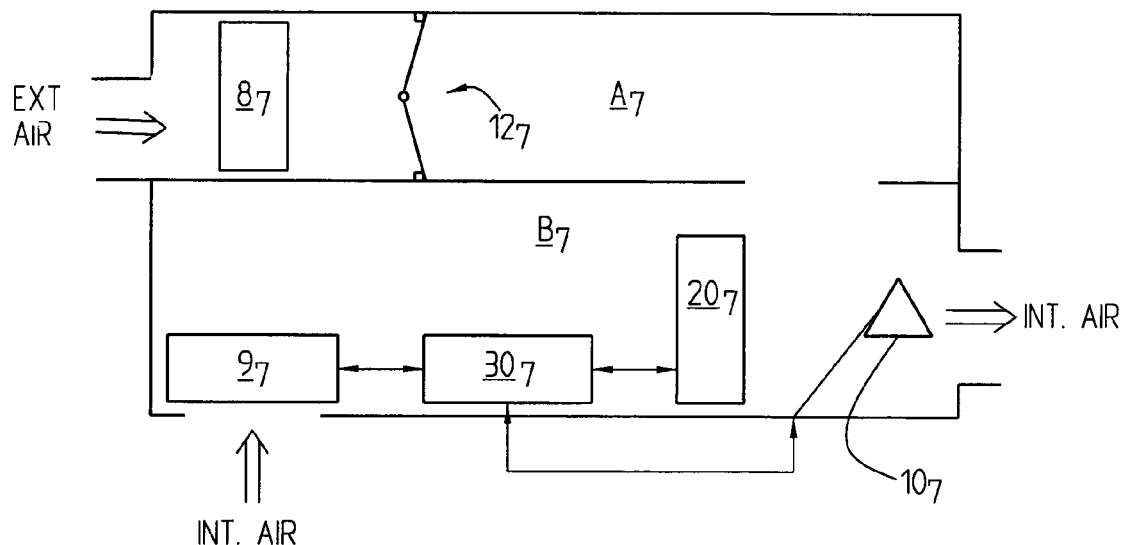
FIG. 7B is a figure similar to that of 7A for a somewhat different implementation.

FIGS. 7A and 7B show two embodiments similar to those of FIG. 5, 6, thus for two chambers A, B. Like reference numbers are used as in FIGS. 5 and 6 respectively but with indices to 6 and 7 respectively. In other aspects the figures should be self-explanatory.

In order to still further reduce the measurement errors, the expansion of air with temperature can be also be taken into consideration. The error produced thereby is very low but results from the fact that the air volume that passes the chamber or the heating element or into the heating element is not the same as the air volume that exits therefrom. When air is heated from for example 0° C. to 50° C., the volume increases with about 16.7%. This is below exemplified by means of an example.

It is supposed that the air temperature is 0° C., the relative humidity is 70%. The absolute humidity is then the saturation vapour content value, here 86 g/m³ multiplied by $H_{rel}$, 0.7, which gives 4.86×0.7=3.4 g/m³.

If the temperature then is raised by 50° C., the air will expand by about 16.7%. The vapour content will then be 3.4/1.167=2.9 g/m³ and the saturation vapour content value is 83 g/m³. The real nominal relative humidity will then be 2.9/83=3.5% instead of 3.4/83=4.1%. It should however be noted that for most practical implementations this error is so low that it will be nearly insignificant but it can be compensated for when needed. It should be clear that the firs temperature in principle can be any, lower than 0°, upto room temperature or more.

Figure 8:
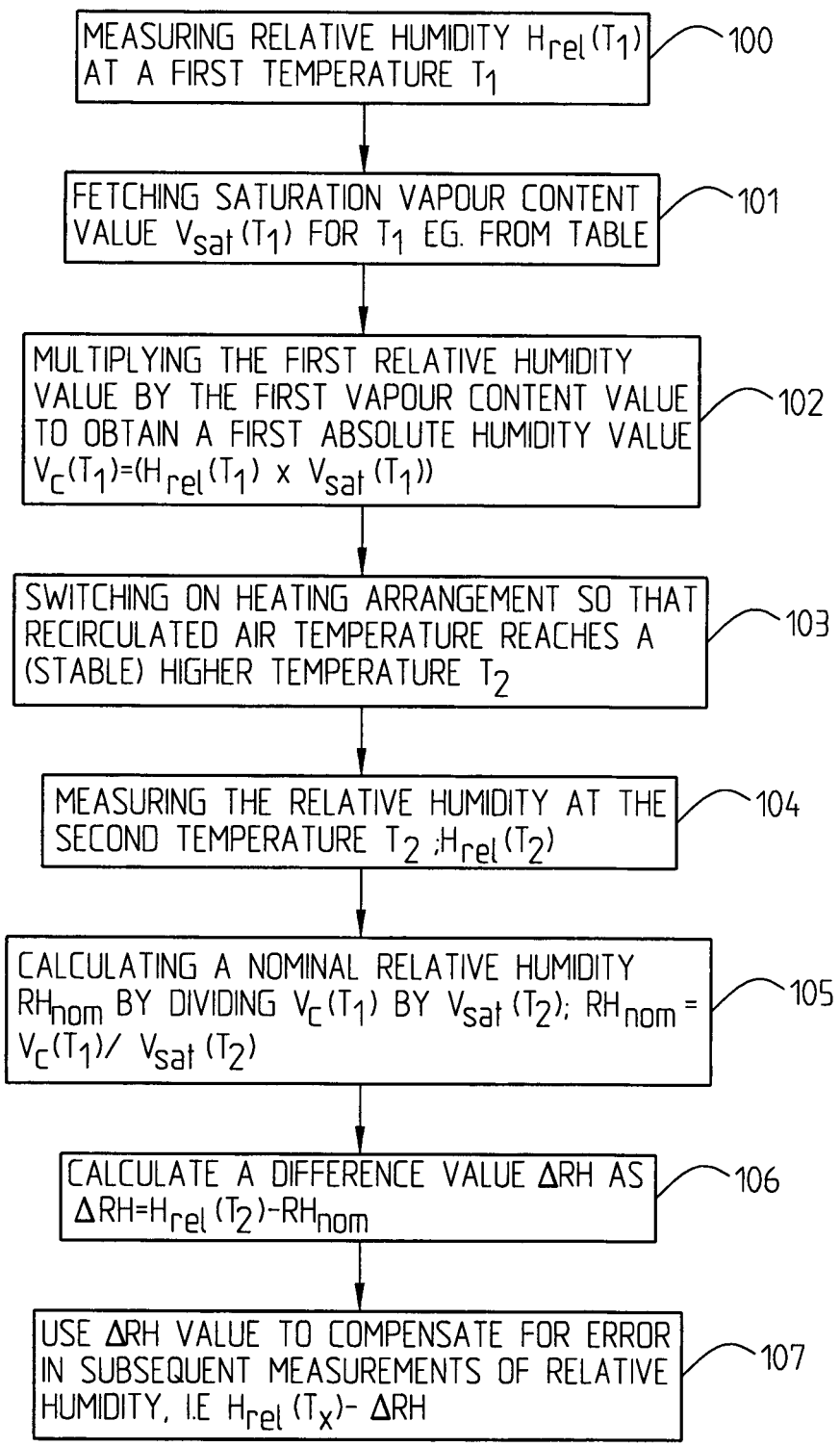
FIG. 8 is a schematical flow diagram describing one implementation of a method according to the invention.

FIG. 8 schematically describes a method according to one particular embodiment of the present invention. In a first step the relative humidity of ventilated or recirculated air, $H_{rel}(T_1)$, at a first (measured) temperature T1 is measured, 100. One particular implementation relates to air recirculated from normally not heated spaces or rooms, for example attics, basements or similar. However, the inventive concept is also applicable for other spaces which normally are more or less heated. The information on the relative humidity and the first temperature is provided via a control means, which may be implemented as a separate unit externally of a chamber communicating via an inlet connection (channel) and an outlet connection (channel) to the space, be arranged externally of such a chamber or adapted to also comprise the humidity sensing device. It has access to saturation vapour content values with different temperatures, for example from a table but it can also be connected to means providing an approximation or itself provide an approximation.

In this case it is supposed that it is provided with, or fetches, information on the saturation vapour content value $V_{sat}(T_1)$ for a first temperature, 101. Then the first relative humidity value is multiplied by the first saturation vapour content value at $T_1$, obtainable from for example a table, to provide a first absolute humidity value, $V_c(T_1)=H_{rel}(T_1) \times V_{sat}(T_1)$, 102.

Then the controlling means for example provides a signal to the heating arrangement to increase the temperature of the recirculated air (in the chamber) and e.g. after lapse of a certain time period; it is here supposed to be monitored that the or a second stable temperature $T_2$, which is considerably higher than $T_1$, is reached, 103. It should be clear that also the heating arrangement can be combined with the control means, or it may comprise separate heating means. In advantageous implementations the temperature increase is between 30° C.-70° C. or more particularly between 40° C.-60° C. or if the room is pre-heated, for example corresponding to normal room temperature or a lower temperature, it may be increased up to even higher values, or the values mentioned above (or lower). Then the relative humidity value at the second temperature $T_2$ is established, $H_{rel}(T_2)$, 104. The nominal relative humidity $RH_{nom}$ is calculated by dividing the first absolute humidity value at $T_1$ by the saturation content value at the second temperature, which in a preceding, not illustrated step, of the step, 104, has been fetched or provided by the control means, $RH_{nom}=V_c(T_1)/V_{sat}(T_2)$, 105. Then a difference value ΔRH is calculated as $\Delta RH=H_{rel}(T_2)-RH_{nom}$, 106. This difference value is stored and used to compensate for errors in subsequent measurements of relative humidity, i.e. a measured $H_{rel}$ at an arbitrary temperature $T_x$–ΔRH forms a compensated relative humidity at temperature $T_x$, 107. As referred to above, if the difference value is large or exceeds a predetermined value, also depending on required accuracy, the steps above can be repeated as many times as necessary until an acceptable difference value is obtained by using as $H_{rel}(T_1)$ a compensated relative humidity value, instead of an actually measured relative humidity.

It should be clear that the invention is not limited to the specifically illustrated embodiments, but that it can be varied in a number of ways within the scope of the appended claims.

The invention claimed is:

1. A system for measuring humidity in a ventilated space, comprising:
   a sensing device that includes a humidity sensor and a temperature sensor configured for measuring relative humidity and temperature of air recirculated from the ventilated space;
   a heating device;
   a control system connected to the heating device and to the sensing device and including a memory configured for storing values of saturation vapor content of air at different temperatures,
   wherein the sensing device is configured for measuring a relative humidity value $H_{rel}(T_1)$ at a first temperature $T_1$; the control system is configured for retrieving a saturation vapor content value $V_{sat}(T_1)$ for the first temperature and for calculating a first absolute humidity value $V_c(T_1)$ for the first temperature by at least multiplying the first saturation vapor content value by the first relative humidity value; the sensing device is configured for measuring a second temperature $T_2$ and a second relative humidity value $H_{rel}(T_2)$ at the second temperature that is higher than the first temperature; and the control system is configured for retrieving a second saturation vapor content value $V_{sat}(T_2)$ for the second temperature, for calculating a nominal relative humidity value $RH_{nom}$ by at least dividing the first absolute humidity value $V_c(T_1)$ by the second saturation vapor content value $H_{sat}(T_2)$, for determining a difference ΔRH between the second relative humidity value $H_{rel}(T_2)$ and the nominal relative humidity value $RH_{nom}$, and for adjusting subsequent relative humidity values of the sensing device based on the difference, thereby providing compensated relative humidity values.

2. The system of claim 1, wherein the control system is configured for using a compensated relative humidity value as a first relative humidity value and a subsequent respective measured second relative humidity value to provide a respective new difference value, thereby increasing accuracy of the sensing device, and for repeating the using a plurality of times, thereby obtaining a plurality of compensated relative humidity values with higher accuracy.

3. The system of claim 1, wherein the sensing device is configured for measuring the temperature and relative humidity of air in or from an unheated space.

4. The system of claim 1, wherein the sensing device is configured for measuring the temperature and relative humidity of air in or from a heated space.

5. The system of claim 4, wherein the heating device is arranged in a separate chamber configured for receiving ventilated air from the space or in an outlet from the space.

6. The system of claim 1, wherein the sensing device comprises a combined humidity and temperature sensor.

7. The system of claim 1, wherein the sensing device comprises a humidity sensor and a separate temperature sensor that are connected to the control system by either separate connection mechanisms or common connection mechanisms.

8. The system of claim 1, wherein the control system is configured for compensating humidity values for temperature-dependent expansion of air.

9. The system of claim 8, wherein the second temperature value is substantially 50° C.

10. The system of claim 1, wherein the second temperature value $T_2$ is substantially 10° C.-70° C. above the first temperature value $T_1$.

11. The system of claim 10, wherein the second temperature value is substantially 30° C.-60° C. above the first temperature value.

12. The system of claim 1, wherein the system is configured for being included in a ventilation system having a chamber with a fan arranged to force air to the space via a supply duct and a return duct for leading ventilated air to the chamber from the space.

13. A method of measuring humidity in a ventilated space, comprising:
 (a) measuring a relative humidity in air recirculated from the space at a first temperature $T_1$, thereby obtaining a first relative humidity value $H_{rel}(T_1)$;
 (b) finding a saturation vapor content value $V_{sat}(T_1)$ representing a saturation vapor content of air at the first temperature;
 (c) determining a first absolute humidity value $V_c(T_1)$ by at least multiplying the first saturation content value $V_{sat}(T_1)$ by the first relative humidity value $H_{rel}(T_1)$;
 (d) increasing the temperature of the recirculated air with a heater;
 (e) measuring the relative humidity in the recirculated air at a second temperature $T_2$ higher than the first temperature, thereby providing a second relative humidity value $H_{rel}(T_2)$;
 (f) finding a saturation vapor content value $V_{sat}(T_2)$ representing a saturation vapor content at the second temperature;
 (g) determining a nominal relative humidity value $RH_{nom}$ by at least dividing the first absolute humidity value $V_c(T_1)$ by the second saturation vapor content value $V_{sat}(T_2)$;
 (h) determining a difference $\Delta RH$ between the second relative humidity value and the nominal relative humidity value; and
 (i) adjusting subsequent relative humidity values based on the difference, thereby compensating measured relative humidity values.

14. The method of claim 13, further comprising repeating (a)-(i) at least one time for new first and second temperatures, each time compensating a new measured first relative humidity value by at least subtracting a respective preceding difference value, thereby forming a first compensated relative humidity value, and using the first compensated relative humidity value as the first relative humidity value and a new second relative humidity value to obtain a new difference value for a subsequent repetition of (a)-(i).

15. The method of claim 13, further comprising heating the recirculated air such that there is a difference of 10° C.-70° C. between the first and second temperatures.

16. The method of claim 15, wherein the second temperature is substantially 40° C.-60° C.

17. The method of claim 13, further comprising compensating a measured humidity value for temperature-dependent expansion of air by reducing the measured humidity value based on an expansion compensation value.

18. The method of claim 13, wherein the method is implemented in a humidity sensing mechanism in an air ventilation system.

\* \* \* \* \*